(12) United States Patent
Cragun et al.

(10) Patent No.: US 8,930,290 B2
(45) Date of Patent: Jan. 6, 2015

(54) ADAPTIVE COGNITIVE SUPPORT SYSTEM

(75) Inventors: Brian J Cragun, Rochester, MN (US); Susann Marie Keohane, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/536,597

(22) Filed: Jun. 28, 2012

(65) Prior Publication Data

US 2014/0006322 A1 Jan. 2, 2014

(51) Int. Cl.
*G06F 15/18* (2006.01)
*G06Q 10/00* (2012.01)

(52) U.S. Cl.
USPC .................................. 706/14; 705/2

(58) Field of Classification Search
None
See application file for complete search history.

(56) References Cited

U.S. PATENT DOCUMENTS

| | | | |
|---|---|---|---|
| 6,225,920 B1 | 5/2001 | Dayle | |
| 6,828,918 B2 | 12/2004 | Bowman et al. | |
| RE41,190 E | 4/2010 | Darling | |
| 7,855,650 B2 | 12/2010 | Duckert et al. | |
| 7,953,613 B2 | 5/2011 | Gizewski | |
| 8,398,546 B2 * | 3/2013 | Pacione et al. | 600/300 |
| 2007/0226033 A1 | 9/2007 | Lopresti | |
| 2012/0011211 A1 | 1/2012 | Smith | |
| 2012/0214140 A1 * | 8/2012 | Brynelsen et al. | 434/127 |
| 2012/0259652 A1 * | 10/2012 | Mallon et al. | 705/2 |
| 2012/0290109 A1 * | 11/2012 | Engelberg et al. | 700/91 |

OTHER PUBLICATIONS

Myers, Karen et al., "An Intelligent Personal Assistant for Task and Time Management", AI Magazine, vol. 28, No. 2, Summer 2007 2007 , 47-61 pages.
Weber, Julie S. , "Preference Learning for Adaptive Interaction", AAAI 2007 Workshop, 2007 2007 , 2 pages.

* cited by examiner

*Primary Examiner* — Alan Chen
(74) *Attorney, Agent, or Firm* — DeLizio Gilliam, PLLC

(57) ABSTRACT

Some embodiments perform a method for managing a person's daily goals based on the person's recent performance in completing certain of the daily goals. The method can include evaluating, by one or more processors, scheduling information associated with the person; evaluating a first set of activity information indicating the person's capabilities; generating goals and tasks based on the scheduling information and the activity information; presenting, on a display device, a first content identifying a first group of the tasks to complete as part of achieving one of the goals; receiving a second set of activity information indicating the person's capabilities in completing the first group of the tasks; modifying the goals based on the second set of activity information; presenting a second content indicating a second group of tasks to complete as part of achieving one of the modified goals.

20 Claims, 5 Drawing Sheets

ADAPTIVE COGNITIVE SUPPORT SYSTEM

BACKGROUND

Embodiments of the inventive subject matter generally relate to the field of computer technologies, and, more particularly, to computer tools for assisting people with cognitive challenges.

There are a variety of circumstances that can cause cognitive decline in people. Many studies focus on cognitive and related functional decline in the elderly. In addition to the elderly, there are also those who suffer cognitive issues due to brain trauma from a stroke, the battlefield, car accident, etc. The health care industry is continuously trying to provide efficient care and grow skills for people whose daily lives are affected by cognitive impairments.

Many people with cognitive issues can live comfortably with modest care, monitoring, and assistance. Such adults are aware of their surroundings, but may suffer from short and long term memory issues that cause momentary confusion. When confused, they may forget to care for themselves, or they may not process tasks in proper order (e.g., putting on socks before shoes). Sometimes, they may repeat activities because they do not recall completing the activities. Therefore, there is a need for tools that assist people with cognitive challenges.

SUMMARY

Some embodiments perform a method for managing a person's daily goals based on the person's recent performance in completing certain of the daily goals. The method can include evaluating, by one or more processors, scheduling information associated with the person; evaluating a first set of activity information indicating the person's capabilities; generating goals and tasks based on the scheduling information and the activity information; presenting, on a display device, a first content identifying a first group of the tasks to complete as part of achieving one of the goals; receiving a second set of activity information indicating the person's capabilities in completing the first group of the tasks; modifying the goals based on the second set of activity information; and presenting a second content indicating a second group of tasks to complete as part of achieving one of the modified goals.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
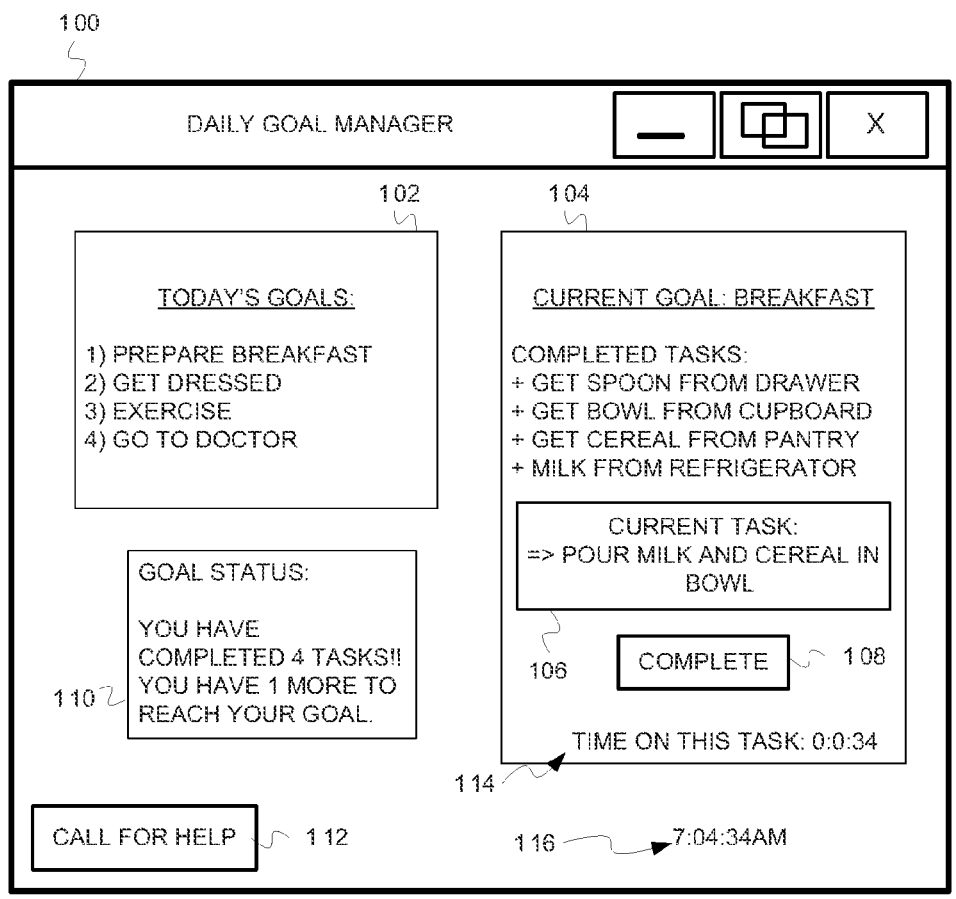
FIG. 1 shows a graphical user interface configure to assist users in achieving daily goals, according to some embodiments of the inventive subject matter.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail to more clearly present the inventive subject matter Some embodiments of the inventive subject matter help people with cognitive and/or physical disabilities accomplish daily goals. In some instances, embodiments provide detailed lists that enumerate tasks necessary to accomplish daily goals. Some embodiments dynamically adapt the goals and tasks based on input indicating how well users are performing the tasks. For example, if a user is doing well, embodiments may make tasks and goals more challenging. By adapting goals and tasks, some embodiments may be used to expedite a rehabilitation process for users.

Some embodiments may be implemented as an application program on a mobile device, where the application program determines a user's daily goals, and provides step-by-step guidance for completing the goals. In some embodiments, the application program presents a graphical user interface (GUI) that prompts the user to perform a sequence of tasks necessary for reaching a goal. For example, the program may prompt a user to perform various tasks necessary for achieving a goal, such as getting dressed for the day. The application program can monitor speed and proficiency with which the user completes the tasks. In some instances, the user provides input when tasks are complete, while in other instances, the program receives input from sensors or other external devices. Based on the input, some embodiments can modify the user's goals, or provide different tasks for achieving those goals. For example, if the input indicates that the user is having a particularly good day, the program may modify the user's daily goals to include interactive activities, such as shopping, exercise, etc. On the other hand, if the input indicates that the user is having difficulty with certain tasks, the program may modify the user's daily goals to be less taxing. In some embodiments, the program modifies goals and tasks by adding new tasks/goals, deleting tasks/goals, changing task/goal difficulty, changing task/goal duration, etc.

In some embodiments, the program facilitates a process of rehabilitating a user. For example, the program may be used to build a user's cognitive and physical abilities to some quantifiable level. As noted, the program tracks a user's capabilities in performing tasks. Based on the user's capabilities, the program can modify the user's goals and tasks to expedite the rehabilitation process. That is, by modifying tasks and goals, the program can increase or reduce challenges at appropriate times, thereby reducing time needed to reach quantifiable cognitive and physical levels.

These and other embodiments are described in greater detail below.

As noted above, in some embodiments, an application program running on a mobile device assists users in achieving daily goals. FIG. 1 shows how one embodiment may look. FIG. 1 shows a graphical user interface configured to assist users in achieving daily goals, according to some embodiments of the inventive subject matter. In FIG. 1, a GUI 100 includes a goals area 102, task area 104, and goal status area 110. The goals area 102 shows a user's goals for the day. As shown, the goals area 102 shows that a user's goals for the day are: 1) prepare breakfast, 2) get dressed, 3) exercise (e.g., walk around the block), and 4) go to the doctor. As will be described in further detail below, some embodiments create the list of daily goals based on a calendar and other scheduling information.

As part of a process for assisting the user in achieving the goals, the task area 104 prompts the user to perform a sequence of tasks for achieving a goal. In FIG. 1, the task area 104 indicates that the user is currently working toward the goal of preparing breakfast. The task area 104 includes a task prompt area 106. As shown, the task prompt area 106 prompts the user to perform a task—e.g., pour milk and cereal into bowl. As the user completes tasks, the GUI 100 shows a list of completed tasks in the task area 104. Therefore, a user can see what tasks have been performed, and on which task the user is currently working. If the user becomes confused, the user can look at the GUI 100 to regain awareness about the tasks and goals.

The GUI 100 also includes a goal status area 110. As shown, the goal status area 110 indicates that the user has completed four tasks, and that there is one task remaining before reaching a goal. In some embodiments, the task status area can convey other information to the user, such as encouragement to complete a task, hints/suggestions on how to complete a task, etc. Because the GUI 110 presents a rich set of information about the user's goals and tasks, embodiments help cognitively challenged users avoid confusion when working toward daily goals.

In FIG. 1, the task area 104 includes a button 108, which the user presses after completing a task. Some embodiments have other means for detecting that the user has completed a task, such as receiving data from local sensors, local devices, and/or external devices (e.g., smart home devices, biometric devices, point-of-sale systems, etc). In some instances, the application program can use the data to determine whether the user performed the task better or worse than usual. For example, if the user presses the "complete" button 108 much quicker than usual, the application program may deduce that the user is functioning better than usual. In response, the application program can dynamically modify the user's goals to be more challenging. As another example, if during a task, the application program receives biometric feedback indicating higher than usual heart rate and blood pressure, the application program may modify the user's goals to be less strenuous. Alternatively, the application program may not modify goals, but may alter the tasks to better fit the user's capabilities. As a result, embodiments of the inventive subject matter can dynamically modify a user's daily goals/tasks based on information about how proficiently the user completes tasks/goals.

Figure 2:
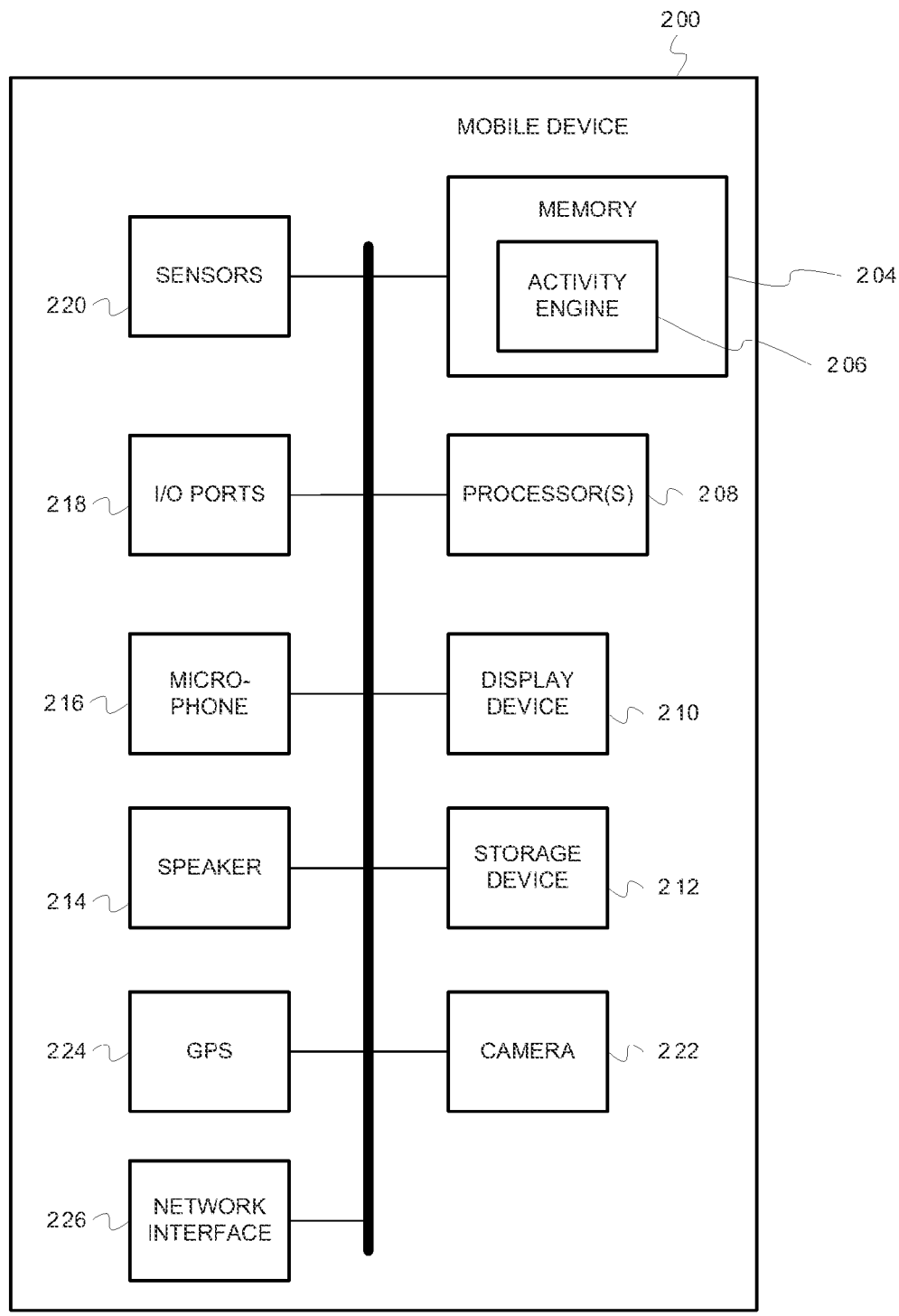
FIG. 2 is a block diagram illustrating an architecture for a mobile device capable of assisting users with daily activities, according to some embodiments of the inventive subject matter.
Figure 3:
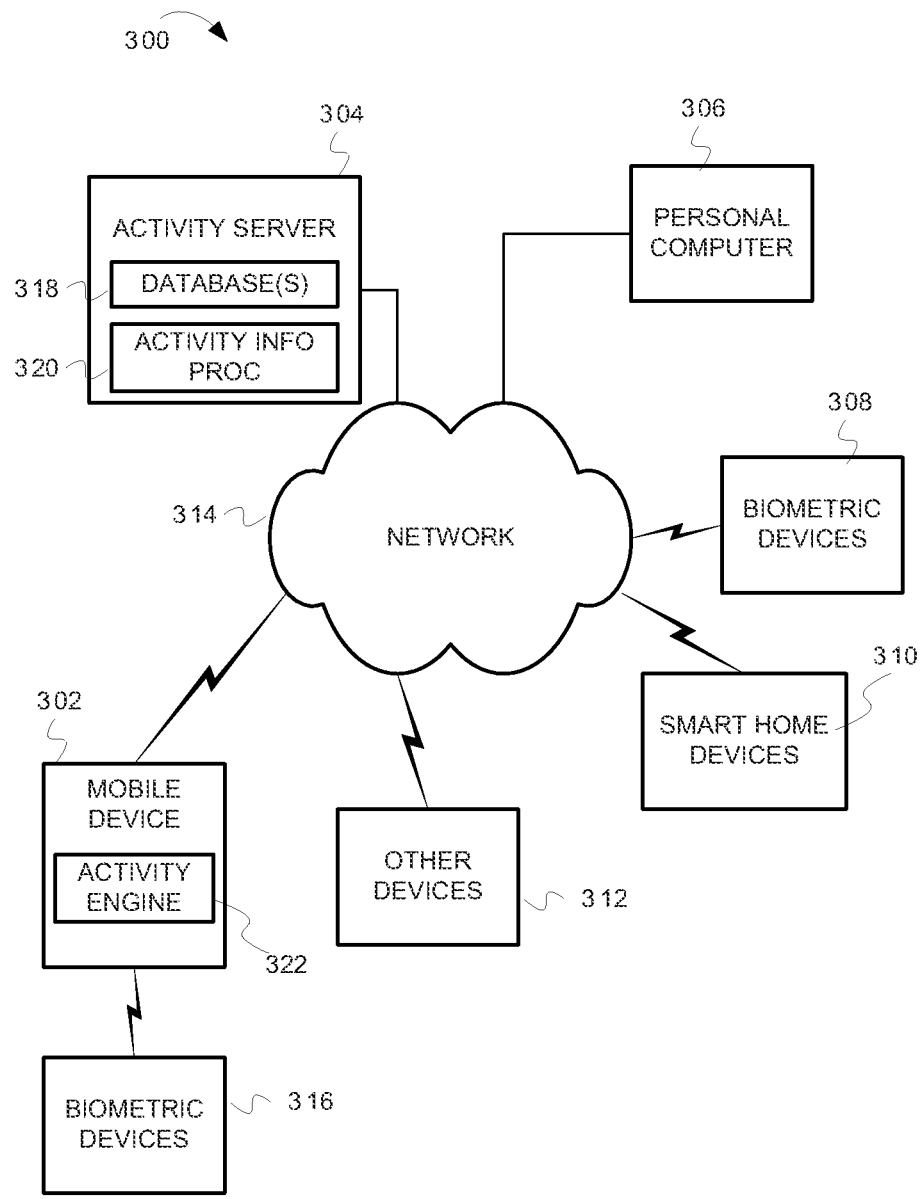
FIG. 3 shows an architecture for devices that can work together to assist users in accomplishing daily goals, according to some embodiments of the inventive subject matter.

FIGS. 2 and 3 describe an architecture for some embodiments of the inventive subject matter. FIG. 2 is a block diagram illustrating an architecture for a mobile device capable of assisting users with daily activities, according to some embodiments of the inventive subject matter. In FIG. 2, a mobile device 200 includes a processor 208 and memory 204. The memory 204 includes an activity engine 206, which is configured to perform operations for assisting users in accomplishing daily goals. In some embodiments, the activity engine 206 presents the GUI 100, and performs other operations described herein. In some embodiments, the activity engine 206 is implemented as an application program that executes on the processor(s) 208. Although not shown, the memory may also include one or more operating systems and other machine instructions for facilitating execution of application programs. In some embodiments, the mobile device 200 can be implemented as a mobile phone, laptop computer, tablet device, or any other suitable mobile device.

The mobile device 200 also includes a display device 210, storage device 212, camera 222, speaker 214, global positioning system unit 224, microphone 216, input/output (I/O) ports 218, sensors 220, and network interface 226. The I/O ports 218 can interface with external devices that provide information about the user's activities (e.g., a heart rate monitor, pedometer, etc.). The sensors 220 can include any suitable sensing technology, such as for detecting biometric information, or other information about the user's activities. The network interface 226 can receive information from external devices (e.g., smart home devices) via wired or wireless networking technologies, such as Wi-Fi™, Bluetooth™, near field communication technologies, etc.

In some embodiments, the activity engine 206 presents information to the user via the speaker 214. For example, for visually challenged users, the activity engine 206 may present information about the user's goals and tasks via the speaker 214. In some instances, the activity engine 206 audibly presents the information shown in the GUI 100. In other instances, the activity engine 206 augments the GUI information with additional audible information. The activity engine 206 may also receive input (e.g., voice commands) via the microphone 216.

FIG. 3 shows an architecture for devices that can work together to assist users in accomplishing daily goals, according to some embodiments of the inventive subject matter. In FIG. 3, a mobile device 302 includes an activity engine 322 configured to assist users in accomplishing daily goals, as described herein. The mobile device 302 is connected to a network 314. The network 314 is connected to an activity server 304, personal computer 306, biometric devices 308, smart home devices 310, and other devices 312. The network 314 can include any suitable networking technologies that facilitate communications between the devices. For example, the network 314 can include Internet technologies, routing devices, web servers, etc.

The activity server 304 includes one or more databases 318 for storing information about users' goals and activities. The activity server 304 also includes an activity information processor 320 that processes activity information to determine users' capabilities, preferences, goals, schedule, etc. The activity engine 322 can exchange activity information with the activity server 304. For example, periodically throughout the day, the activity engine 322 can push a user's activity information to the activity server 304. In response, the activity server 304 can process the information to learn more about a user's capabilities, preferences, goals, schedule, etc. After processing the activity information, the activity server 304 can push to the activity engine 322 the latest information about the user's capabilities, preferences, schedule of goals, etc. Therefore, the activity engine 322 will have fresh information that may be used to dynamically modify the user's goals and tasks.

The activity server 304 can also include a web interface that allows caregivers (i.e. those responsible for caring for/assisting an activity engine user) to enter information about the activity engine user's schedule, preferences, capabilities, etc. Additionally, the activity engine user himself/herself can enter such information via the activity server's web interface. Caregivers and activity engine users can enter such information via the personal computer 306 or mobile device 302.

As shown, the mobile device 302 can interact with smart home devices 310. The smart home devices 302 can include devices that control household appliances. The smartphone devices 310 can indicate whether appliances have been used, and can present information about such use. For example, the smart home devices 310 may be associated with lighting, kitchen appliances (e.g., stove, refrigerator, dishwasher, etc.), plumbing devices (e.g., sinks, toilets, etc.), doors (e.g., door locks, garage door openers, etc.), windows, beds, motion sensors, security systems, etc. In some embodiments, the smart home devices 310 push information to the activity server 304 and activity engine 322. In other embodiments, the activity server 304 and activity engine 322 pull information from the smartphone devices themselves or other components (e.g., servers) that store such information.

The biometric devices 308 and 316 include any suitable devices for detecting biometric information, such as heart rate, blood pressure, pulse rate, blood sugar, calories burned, etc. The biometric devices 308 may communicate with the activity engine 322 and activity server 304 via the network 214. The biometric devices 316 can communicate directly with the mobile device 302 via any suitable wired or wireless technologies. In some embodiments, the biometric devices push information to the activity server 304 and activity engine 322. In other embodiments, the activity server 304 and activity engine 322 pull information from the biometric devices themselves or other components (e.g., servers) that store such information.

As shown, the architecture 300 includes other devices 312. The other devices 312 can include smart medicine bottles that send signals indicating when medicines have been removed from the bottles. The other devices 312 can also include point-of-sale systems, vending machines, personal computing devices, or any other device suitable for providing information about an activity engine user's activities. The activity server 304 and activity engine 322 can utilize information from these devices.

Figure 4:
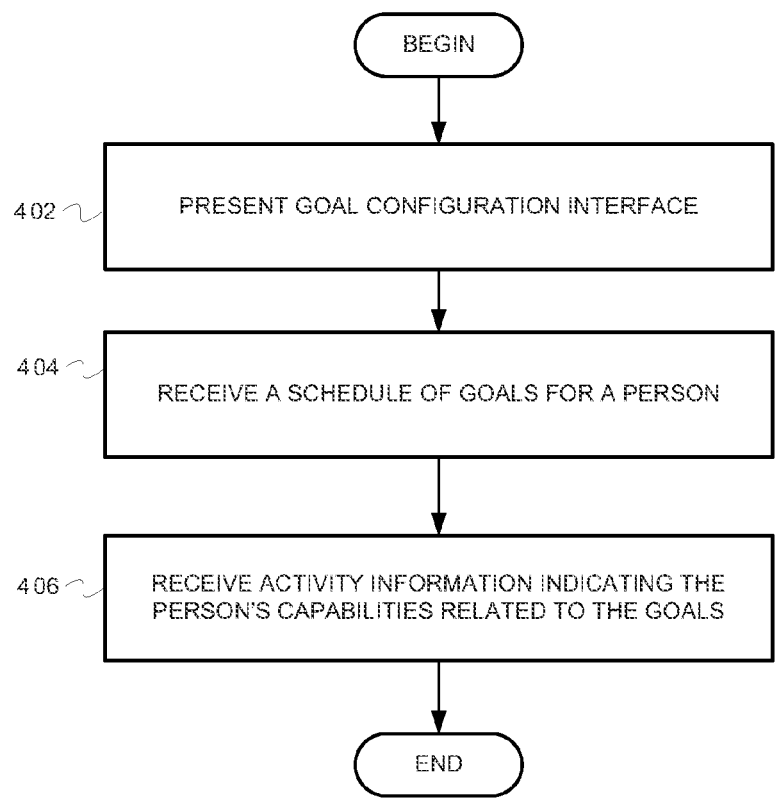
FIG. 4 is a flow diagram illustrating operations for providing information used in determining a user's daily goals, capabilities, preferences, etc.

This discussion will continue with a description of operations performed by some embodiments of the inventive subject matter. In some embodiments, before the activity engine can generate a daily list of goals, it receives information about the goals from the activity server. FIG. 4 shows how some embodiments receive this information.

FIG. 4 is a flow diagram illustrating operations for providing information used in determining a user's daily goals, capabilities, preferences, etc. In FIG. 4, a flow 400 begins at block 402, where the activity server presents a goal configuration interface through which a caregiver (or activity engine user) can provide information for assisting an activity engine user in accomplishing daily goals. In some embodiments, the activity server presents a webpage through which such information can be received. The flow continues at block 404.

At block 404, the activity server receives a schedule of goals for the activity engine user. In some instances, the goal configuration interface presents a calendar into which the caregiver enters appointments (e.g., doctor appointments), events (e.g., social events, movies, outings, etc.), and activities for the activity engine user. Activities can include daily activities, such as preparing breakfast, getting dressed for the day, getting exercise (e.g., going for a walk), and any other suitable daily activities. The flow continues at block 406.

At block 406, the activity server receives information indicating the activity engine user's capabilities. In some embodiments, the activity server presents an interface through which the caregiver can enter information about the activity engine user's cognitive abilities, physical condition, preferences, etc. This information can include rehabilitation goals. The following are example rehabilitation goals: walking for a duration (e.g., 20 minutes), improved communication skills (e.g., talking), walking up and down stairs, reading, performing basic daily tasks (e.g., getting dressed for the day), etc. After block 406, the flow ends.

Figure 5:
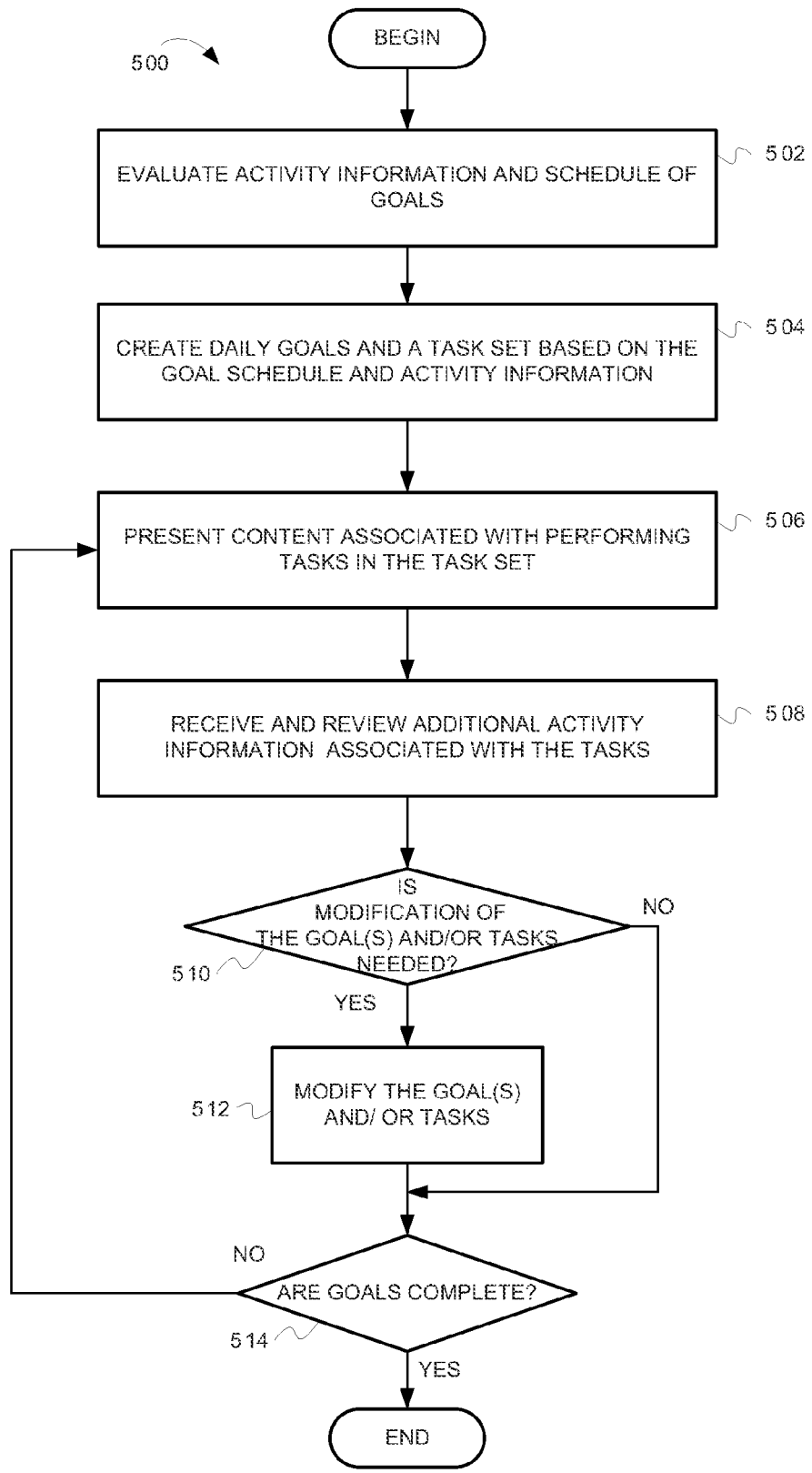
FIG. 5 is a flow diagram illustrating operations for assisting users in accounting daily goals, and modifying daily goals based on information about user activities.

After the activity server receives information about the activity engine user's schedule, capabilities, preferences, etc., the activity server can generate a daily schedule of goals for the user. FIG. 5 provides additional details about how embodiments assist users in achieving their daily goals.

FIG. 5 is a flow diagram illustrating operations for assisting users in accounting daily goals, and modifying daily goals based on information about user activities. In FIG. 5, a flow 500 begins at block 502, where the activity engine evaluates activity information and a schedule of goals for the user. In some embodiments, the activity engine receives, from an activity server, information about a user's activities (e.g., including a calendar of activities for the user), preferences, capabilities, and other information. The activity engine evaluates this information to create a set of goals and tasks. The flow continues at block 504.

At block 504, after evaluating the user's activity information and schedule, the activity engine creates a list of daily goals, and set of tasks necessary for achieving the goals. In some embodiments, the activity server (not the activity engine) evaluates the activity information and schedule, and creates the list of daily goals and tasks for the activity engine. Irrespective of what component creates the list of daily goals and tasks, the activity engine proceeds with operations for assisting a user in achieving the daily goals. The flow continues at block 506.

At block 506, the activity engine presents content associated with performing tasks in the task set. For example, the activity engine may present a graphical user interface that includes a list of daily goals, task information (e.g., a current task to be done, completed tasks, task hints, etc.), goal status, etc. FIG. 1 shows such an interface. In some embodiments, the content includes audio content about the tasks and goals. The audio content can augment information shown in the GUI 100, or it can be the sole means for conveying the information in the GUI 100 (i.e., the activity engine may not present a GUI). The flow continues at block 508.

At block 508, as the user performs tasks, the activity engine receives activity information about the user. In some instances, the activity information includes user input, such as a screen touch indicating that the user has completed a task. The activity information can also include biometric information from biometric devices. For example, the activity information may indicate the user's heart rate, pulse rate, calorie consumption, etc. during a task. The activity information may also originate from smart home devices, or any other devices associated with the user and task. For example, in FIG. 1, the completed tasks include getting a spoon from a drawer, bowl from a cupboard, cereal form a pantry, and milk from a refrigerator. The activity engine may receive activity information from smart home devices located at the drawer, cupboard, pantry, and refrigerator. The activity information may indicate that the drawer, cupboard, pantry, and refrigerator were opened, implying that the user completed certain tasks.

In some embodiments, some activity information may be derived from the user's interactions with application programs running the mobile device. For example, if the user plays games, reads web content, or otherwise interacts with the mobile device, the activity engine can create activity information based on what the user's interactions. If the user does well at particular games, the activity information may indicate that the user's cognitive skills are currently particularly good. In some instances, the activity engine may explicitly ask the user about his/her capabilities. For example, the activity engine may ask (via a GUI or audible content) whether a task or goal was easy or hard (e.g., on a scale of 1 to 5). After receiving the activity information, the activity engine analyzes it.

In some embodiments, before modifying the user's goals and/or tasks, the activity engine analyzes the user's activity information to discern performance patterns. Some patterns may indicate that the user typically: performs well at certain times of day, performs certain tasks well, performs well under certain conditions, etc. For example, the activity information may indicate that a user's cognitive abilities are best at a certain time of day. As another example, the activity information may indicate that a user exhibits high stress during walking, and low stress during seated calisthenics. Based on an analysis of the activity information, some embodiments of the activity engine can determine tasks that will optimize rehabilitation. For example, the activity information may indicate that the user is currently experiencing cognitive difficulties, but that the user typically has much higher cognitive awareness at a particular time of day. In response, the activity engine may modify the user's tasks to reduce cognitive challenges now, while increasing cognitive challenges at a time when the user will be cognitively stronger. As a result, the user will make progress toward an overall rehabilitation goal.

The activity engine can modify tasks and goals in any suitable way. The activity engine can increase or decrease task parameters in linear or nonlinear fashion (e.g., depending on rehabilitation goals—see discussion of block 404.) For example, the activity engine can increase a user's walk duration by 10% (e.g., from 10 to 11 minutes). Similarly, the activity engine can increase the walk difficulty by 10%, such as by asking the user to quicken the walking pace. Next time the activity engine modifies the user's walking task, it may increase the duration by 20%, as it tracks the user's capabilities and determines the user can handle the larger increase. Yet later, the activity engine may increase the user's walk difficulty and/or duration even more (e.g., by more than linear increase). After the user reaches a rehabilitation goal, the activity engine may continue increasing task difficulty to make the user even stronger.

The flow continues at block 510.

At block 510, the activity engine determines whether to modify the user's list of daily goals and/or tasks associated with the goals. If the activity information indicates that the user is having difficulty performing one or more of the tasks, the activity engine can modify the task list. Referring to the example in FIG. 1, if the user was having trouble procuring the spoon, bowl, and milk, the activity engine can modify the tasks to make breakfast preparation easier. For example, the activity engine may prompt the user to consume an easily-accessible nutrition drink for breakfast, instead of preparing cereal. As another example, if the user is in the process of achieving a goal of exercise, the activity engine may modify the exercise goal based on biometric information from a heart monitor. If the goals and/or tasks should be modified, the flow continues at block 512. Otherwise, the flow continues at block 514.

At block 512, the activity engine modifies the user's goals and/or tasks. The flow continues at block 514.

At block 514, the activity engine determines whether the user's has accomplished all the daily goals. If the user has not accomplished all daily goals, the flow continues at block 506. Otherwise, the flow ends.

Based on the foregoing, it should be apparent that embodiments of the inventive subject matter can be used in various situations. In some instances, users can utilize the activity engine to assist in a rehabilitation process by which the user is attempting to achieve improved capabilities for activities, such as walking, reading, awareness, memory, speech, etc. In other situations, irrespective of rehabilitation, the activity engine may facilitate daily living by guiding users through tasks and adapting tasks to suit users' current capabilities. In yet other situations, some embodiments may facilitate physical training by adapting training tasks to more quickly desired capability levels. For example, some embodiments can increase a user's strength and endurance by providing fitness tasks associated with fitness goals. As the activity engine receives activity information about the user's performance, it may increase or decrease difficulty of the fitness tasks, thereby expediting achievement of an overall (or particular) fitness capability level.

As will be appreciated by one skilled in the art, aspects of the present inventive subject matter may be embodied as a system, method or computer program product. Accordingly, aspects of the present inventive subject matter may take the form of an entirety hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for assisting users achieve daily goals as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for managing a person's daily goals based on the person's recent performance in completing certain of the daily goals, the method comprising:
    evaluating, by one or more processors, scheduling information associated with the person;
    evaluating a first activity information indicating the person's capabilities;
    generating goals and tasks based on the scheduling information and the activity information;
    presenting, on a display device, a first content identifying a first group of the tasks to complete as part of achieving one of the goals;
    receiving a second activity information indicating the person's capabilities in completing the first group of the tasks, wherein the second activity information is added to activity information for the person;
    determining a cognitive ability pattern based, at least in part, on the activity information;
    modifying the goals based, at least in part, on the cognitive ability pattern and a current time of day;
    presenting a second content indicating a second group of tasks to complete as part of achieving one of the modified goals.

2. The computer-implemented method of claim 1, wherein the second activity information includes touchscreen input indicating a rating by the person of a difficulty of completing at least one task in the first group of the tasks.

3. The computer-implemented method of claim 1, wherein the cognitive ability pattern indicates the person's capabilities are less than usual at the current time of day.

4. The computer-implemented method of claim 3, wherein the second group of tasks include activities requiring lesser capabilities from the person.

5. The computer-implemented method of claim 1, wherein the second activity information includes information originating from smart home devices.

6. The computer-implemented method of claim 1, wherein the first content includes a graphical user interface that presents an indication after ones of the first group of the tasks are completed by the person.

7. The computer-implemented method of claim 1, wherein the first activity information includes information about a rehabilitation process for the person, and wherein the modified goals attempt to expedite the rehabilitation process.

8. A computer program product for managing a person's daily goals based on the person's recent performance in completing certain of the daily goals, the computer program product comprising:
    a computer readable storage device having computer usable program code embodied therewith, the computer usable program code comprising a computer usable program code configured to:
    evaluate, by one or more processors, scheduling information associated with the person;
    evaluate a first set of activity information indicating the person's capabilities;
    generate goals and tasks based on the scheduling information and the activity information;
    present, on a display device, a first content identifying a first group of the tasks to complete as part of achieving one of the goals;
    receive a second set of activity information indicating the person's capabilities in completing the first group of the tasks, wherein the second set of activity information is added to activity information for the person;

determine a cognitive ability pattern based, at least in part, on the activity information;

modify the goals based, at least in part, on the cognitive ability pattern and a current time of day;

present a second content indicating a second group of tasks to complete as part of achieving one of the modified goals.

9. The computer program product of claim 8, wherein the second set of activity information includes touchscreen input indicating a rating by the person of a difficulty of completing at least one task in the first group of the tasks.

10. The computer program product of claim 8, wherein the cognitive ability pattern indicates the person's capabilities are less than usual at the current time of day.

11. The computer program product of claim 10, wherein the second group of tasks include activities requiring lesser capabilities from the person.

12. The computer program product of claim 8, wherein the second set of activity information includes information originating from smart home devices.

13. The computer program product of claim 8, wherein the first content includes a graphical user interface that presents an indication after ones of the first group of the tasks are completed by the person.

14. An apparatus comprising:

at least one processor;

a computer readable storage medium having computer usable program code that is executable on the at least one processor, the computer usable program code configured to:

evaluate, by one or more processors, scheduling information associated with a person;

evaluate a first set of activity information indicating the person's capabilities;

generate goals and tasks based on the scheduling information and the activity information;

present, on a display device, a first content identifying a first group of the tasks to complete as part of achieving one of the goals;

receive a second set of activity information indicating the person's capabilities in completing the first group of the tasks, wherein the second set of activity information is added to activity information for the person;

determine a cognitive ability pattern based, at least in part, on the activity information;

modify the goals based, at least in part, on the cognitive ability pattern and a current time of day;

present a second content indicating a second group of tasks to complete as part of achieving one of the modified goals.

15. The apparatus of claim 14, wherein the second set of activity information includes touchscreen input indicating a rating by the person of a difficulty of completing at least one task in the first group of the tasks.

16. The apparatus of claim 14, wherein the cognitive ability pattern indicates the person's capabilities are less than usual at the current time of day.

17. The apparatus of claim 14, wherein the second group of tasks include activities requiring lesser capabilities from the person.

18. The apparatus of claim 14, wherein the second set of activity information includes information originating from smart home devices.

19. The apparatus of claim 14, wherein the first content includes a graphical user interface that presents an indication after ones of the first group of the tasks are completed by the person.

20. The apparatus of claim 14, wherein the first set of activity information includes information about a rehabilitation process for the person, and wherein the modified goals attempt to expedite the rehabilitation process.

* * * * *